(12) United States Patent
Qureshi et al.

(10) Patent No.: US 7,606,980 B2
(45) Date of Patent: Oct. 20, 2009

(54) DEMAND-BASED ERROR CORRECTION

(75) Inventors: Moinuddin K. Qureshi, Austin, TX (US); Paul B. Racunas, Marlborough, MA (US); Shubhendu S. Mukherjee, Framingham, MA (US)

(73) Assignee: Intel Corporation, Santa Clara, CA (US)

(*) Notice: Subject to any disclaimer, the term of this patent is extended or adjusted under 35 U.S.C. 154(b) by 409 days.

(21) Appl. No.: 11/363,963

(22) Filed: Feb. 27, 2006

(65) Prior Publication Data

US 2007/0260820 A1 Nov. 8, 2007

(51) Int. Cl.
*G06F 11/08* (2006.01)
(52) U.S. Cl. .................. 711/144; 711/143; 711/126; 714/6
(58) Field of Classification Search .................. 711/143, 711/144, 126; 714/6
See application file for complete search history.

(56) References Cited

U.S. PATENT DOCUMENTS

| | | | | |
|---|---|---|---|---|
| 6,480,975 | B1* | 11/2002 | Arimilli et al. | 714/52 |
| 7,219,185 | B2* | 5/2007 | Luick | 711/5 |
| 7,437,597 | B1* | 10/2008 | Kruckemyer et al. | 714/6 |
| 2002/0032891 | A1* | 3/2002 | Yada et al. | 714/66 |

OTHER PUBLICATIONS

Gharachorloo et al., Efficient ECC-Based Directory Implementations for Scalable Multiprocessors, 12th symposium on Computer Architecture and High-Performance Computing, Oct. 2000.*

* cited by examiner

*Primary Examiner*—Brian R Peugh
*Assistant Examiner*—Jared I Rutz
(74) *Attorney, Agent, or Firm*—Caven & Aghevli LLC

(57) ABSTRACT

A technique for demand-based error correction. More particularly, at least one embodiment of the invention relates to a technique to reduce storage overhead of cache memories containing error correction codes (ECC) while maintaining substantially the same performance of the cache.

22 Claims, 5 Drawing Sheets

[[DEMAND-BASED ERROR CORRECTION]]

DEMAND-BASED ERROR CORRECTION

BACKGROUND

1. Field

The present disclosure pertains to the field of information processing, and more specifically, to the field of data error correction within a memory, such as cache memory.

2. Background

Figure 1:
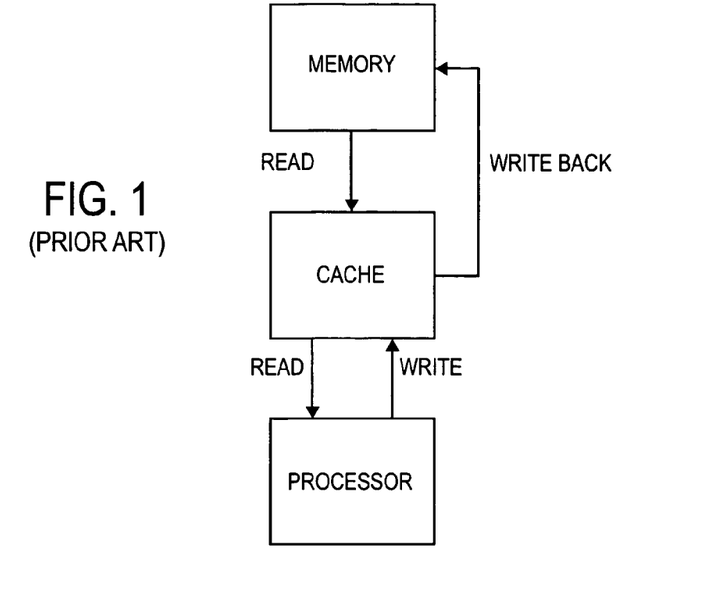
FIG. 1 illustrates a prior art computer system including a processor, cache module, and memory.

Computer systems and/or microprocessors may use one or more cache memories to provide relatively fast access to recently used data. FIG. 1, for example, shows a computer system consisting of a processor, cache, and memory. In general, the cache module may consist of multiple levels of cache, however, for simplicity only one level of cache is shown. When the processor fetches instructions or data (generically referred to as "data"), it may first access the cache module. If the access results in a cache "hit" (i.e., the requested data is present in the cache), the cache may supply the data to the processor. If the access results in a miss (i.e., the requested data is not present in the cache), the cache may access the corresponding line from the memory (e.g., DRAM) and then store it in the cache.

In the case that a processor programs, or "writes", data to memory (via issuing a "write request" transaction to from the processor to the memory, for example), the data may or may not be written directly to the memory, depending on the write policy of the cache. For example, if the cache uses a "write-through" policy, the data may be written to the cache as well as the memory. Whereas, if the cache uses a "write-back" policy, data may be written only to the cache and the corresponding cache line may be marked as "modified" and then written back to memory when the line is evicted from the cache.

The choice of whether to use a write-back cache or a write-through cache depends upon several design concerns, such as available bus bandwidth. In general, a write-back cache may require less bus bandwidth than a write-through cache. In order to conserve off-chip bus bandwidth (i.e., bus bandwidth from the processor to memory), many modern cache hierarchies may use a write-back policy.

A cache memory may be susceptible to data corruption, causing erroneous data to be stored in the cache and used by a processor. Erroneous data in the cache, if not detected, can result in a processor using the erroneous data to enter an undesired state and/or generate an undesired result. Cache errors, or "faults", that are detected but cannot be corrected, are sometimes referred to as detected unrecoverable errors (DUE).

For write-through caches (i.e., those caches using a write-through policy), a copy of all cached data is available in memory. Therefore, write-through caches may be protected from cache faults by merely detecting the cache error, via error detection codes (EDC), for example, which may be used in a parity check against the cache data. In a write-through cache, if an error is detected in a cache line, the corresponding cache line may be invalidated and a copy of the line read from memory.

However, for write-back caches, copies of the modified cache lines are not necessarily available in a memory system. If write-back caches are protected only with EDC, then an error in a modified line can result in a DUE condition. To avoid a DUE condition, write-back caches typically use error correction codes (ECC), which are used not only to detect but also to correct the cache fault.

Figure 2:
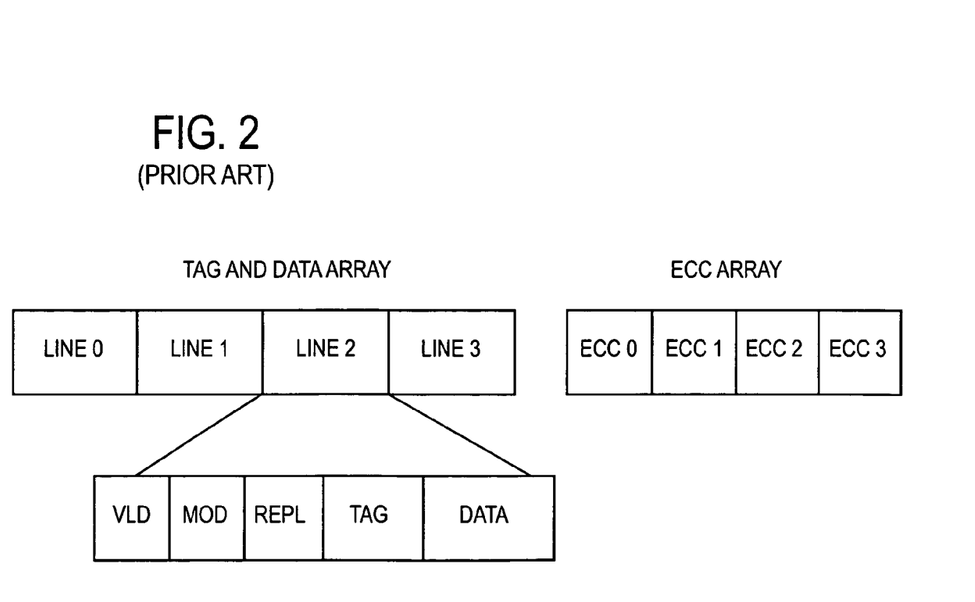
FIG. 2 illustrates a prior art 4-way set associative cache array, in which each cache line has a corresponding ECC.

FIG. 2 illustrates a prior art four-way set associative cache array, in which each line (lines 0, 1, 2, 3) has a corresponding ECC (ECC 0, 1, 2, 3). In the example of FIG. 2, each line contains information to indicate whether the line is valid ("vld" field), whether the line has been modified ("mod" field), and whether the line is to be replaced, or "evicted", ("repl" field). Furthermore, each line contains an indicate of what memory address the line corresponds to ("tag" field), and the data/instruction stored in the cache line ("data" field).

Because each cache line has a corresponding ECC, the prior art cache array of FIG. 2 may require substantial storage overhead. ECC storage overhead is increased if a cache uses a uniform fault-tolerance policy for all the cache lines, and therefore includes an ECC for each cache line. Accordingly, processors and/or computing systems containing write-back caches that use ECC may incur substantial cost in area and power consumption over those that use write-through caches. Therefore, the full bus throughput benefits of write-back cache systems may be needlessly offset by additional hardware overhead for various computer systems and processors.

BRIEF DESCRIPTION OF THE FIGURES

The present invention is illustrated by way of example and not limitation in the accompanying figures.

DETAILED DESCRIPTION

Embodiments of the invention relate to computer systems. More particularly, at least one embodiment of the invention relates to a technique to reduce storage overhead of cache memories containing error correction codes (ECC) while maintaining substantially the same performance of the cache. At least one embodiment of the invention makes use of the fact that only modified cache lines (i.e., those cache lines in the 'modified' state) need error correction, whereas unmodified cache lines (i.e., those cache lines not in the 'modified' state) may only need error detection, if at all. Therefore, storage overhead may be saved, in one embodiment, by only including enough ECC fields for a cache line to enable error correction for a maximum number of modified cache lines that may exist in a cache array concurrently.

In one embodiment, storage overhead of write-back caches can be reduced by using ECC field for only cache lines that are in the 'modified' state. Moreover, at least one embodiment enables the ECC codes to be dynamically associated with different cache lines as cache lines enter and leave the modified state. In one embodiment, the number of cache lines in a particular array of cache lines (for instance, a 4-way set-associative cache array) that may be in the modified state at any particular time is restricted to two. In other embodiments, the number of cache lines in an array that may be in a modified state concurrently may be less or more than two. Furthermore, in other embodiments the number of cache lines in an array that may be in a modified state concurrently may change dynamically.

Figure 3:
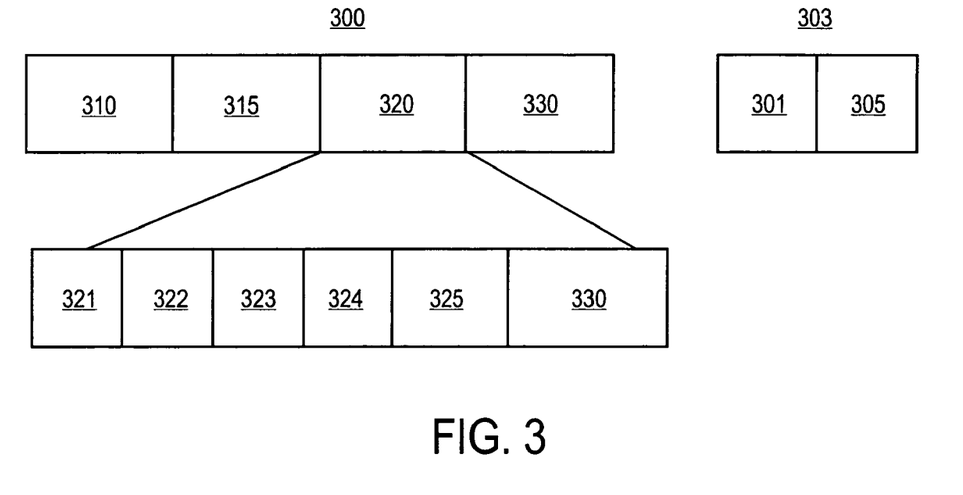
FIG. 3 illustrates a 4-way set associative cache array, according to one embodiment of the invention.

FIG. 3 illustrates an array of cache lines, according to one embodiment, in which only two ECC fields are available to be associated with no more than two modified cache lines at a time. Specifically, the two ECC fields 301 and 305, within ECC array 303 may be dynamically allocated to any two of the four cache lines 310, 315, 320, and 330 concurrently, within cache line array 300. In this manner, the number of ECC fields, and therefore the storage area necessary to store them, may be reduced. Although the cache array depicted in FIG. 3 is a 4-way set-associative cache array, the principals of at least one embodiment of the invention may be applied to any type of cache line in which ECC, EDC, or other state-dependent information overhead is maintained. In general, embodiments of the invention may be extended to caches or other storage types in which some amount of overhead is maintained, and in which the overhead maintained is dependent upon the state of the information (data or instructions) stored therein.

In one embodiment, the two ECC fields are dynamically allocated to two of the four lines illustrated in the 4-way set-associative cache of FIG. 3 according to which of the cache lines are concurrently in a modified state, indicated by the modified field of the cache line. Furthermore, at least one embodiment of the invention restricts the number of cache lines in the array of FIG. 3 that may be in the modified state concurrently by including an identifier in each cache line that identifies the ECC field to which the cache line corresponds. In one embodiment, the identifier may change if the number of modified cache lines in the modified state is less than the number allowed (e.g., 2 in one embodiment).

For example, the contents of cache line 320 are illustrated in FIG. 3 to include a valid field indicator 321, modified field indicator 322, identifier field indicator 323, replacement indicator field 324, tag field 325, and data (or instruction) field 326. In one embodiment, the identifier field ("ID" field) identifies one of the ECC fields to which the cache line corresponds. Similarly, there may be another cache line whose ID field identifies the other ECC field. In other embodiments there may be more ECC fields and therefore the ID fields of more cache lines would identify a corresponding ECC field. In one embodiment the ID of one cache line may contain a "0" value, for example, to identify one of the ECC fields, whereas a second cache line may contain a "1" value to identify the other ECC field. In other embodiments, other ID values may be used to identify the ECC field corresponding to a particular cache line.

In the embodiment illustrated in FIG. 3, however, the number of ECC fields, and therefore the number of cache lines that may be in the modified state is restricted to two. Only two cache lines in FIG. 3 may be in a modified state concurrently, thereby reducing the number of ECC fields that must be maintained. The remaining cache lines may use EDC, however. In other embodiments, the remaining non-modified cache lines may not use EDC.

Figure 4:
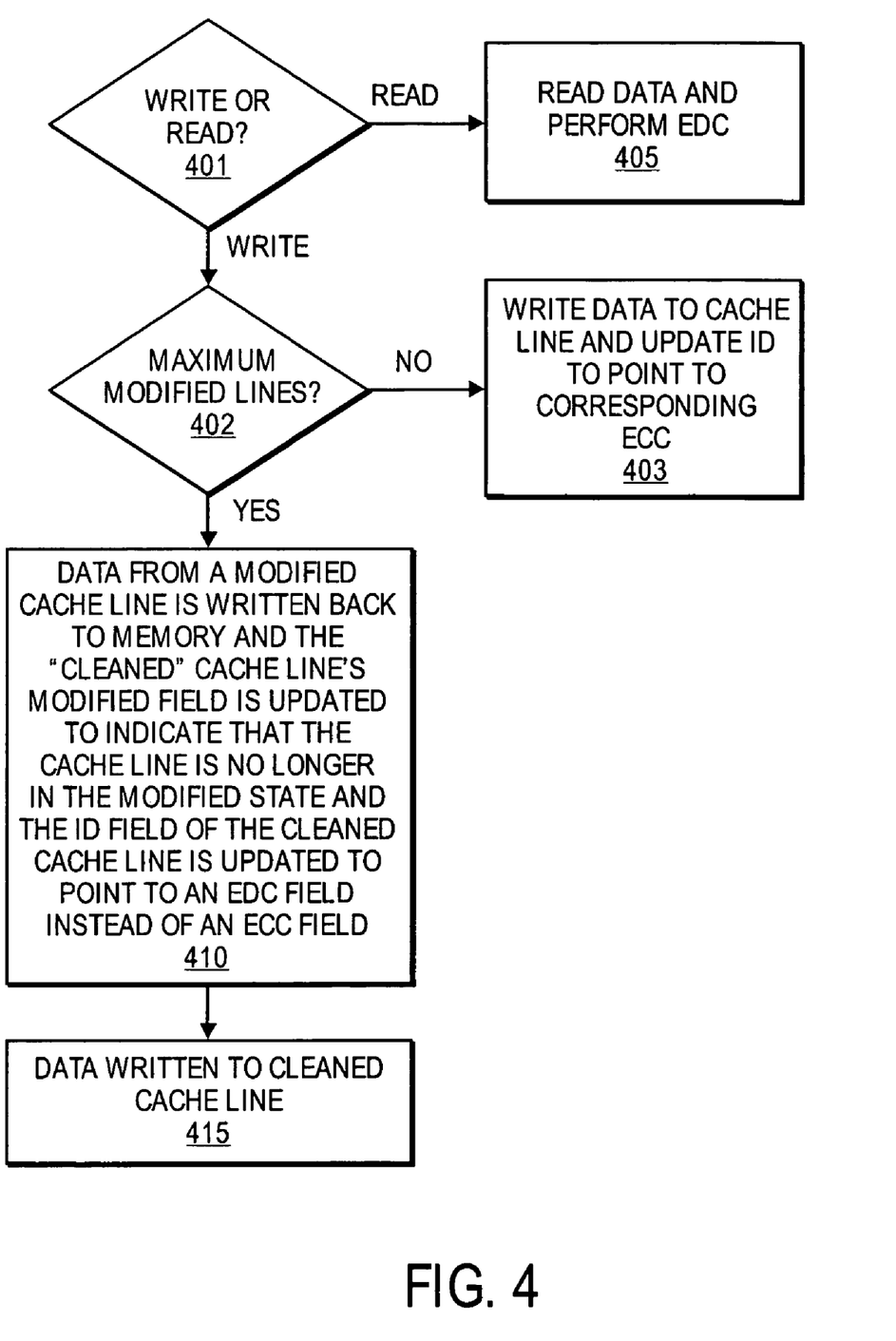
FIG. 4 is a flow chart illustrating operations that may be used in performing at least one embodiment of the invention.

FIG. 4 illustrates operations used in a technique to update ID fields of cache lines in response to cache lines entering and exiting the modified state, according to one embodiment. If a cache line is being read at operation 401, for example, the data field of the cache line is retrieved at operation 405. In one embodiment, the data field may be checked against a corresponding EDC field and if the result indicates an error, the cache line may be checked as invalid by updating a field within the cache line (e.g., "vld" field illustrated in FIG. 3).

If the cache line is written at operation 401, and if the number of cache lines in the modified state would not exceed an allowed limit as a result of the write operation, at operation 402, then the data from the write operation is programmed into the data field of the addressed cache line and the ID field of the cache line is updated to point to one of the ECC fields (e.g., one that is not already associated with a cache line in the modified state) at operation 403. However, if the write operation would cause the number of cache lines in the modified state to exceed the allowed limit, then at operation 410, data from a modified cache line already associated with an ECC field is written back to memory and the "cleaned" cache line's modified field is updated to indicate that the cache line is no longer in the modified state and the ID field of the cleaned cache line is updated to point to an EDC field instead of an ECC field. After an ECC field is free to use again, at operation 415, the data from the pending write operation can be programmed to the cleaned cache line, the modified (e.g., "mod" field in FIG. 3) field updated to indicate that the data is modified, and the ID field of the cache line is set to point to the free ECC field.

Figure 5:
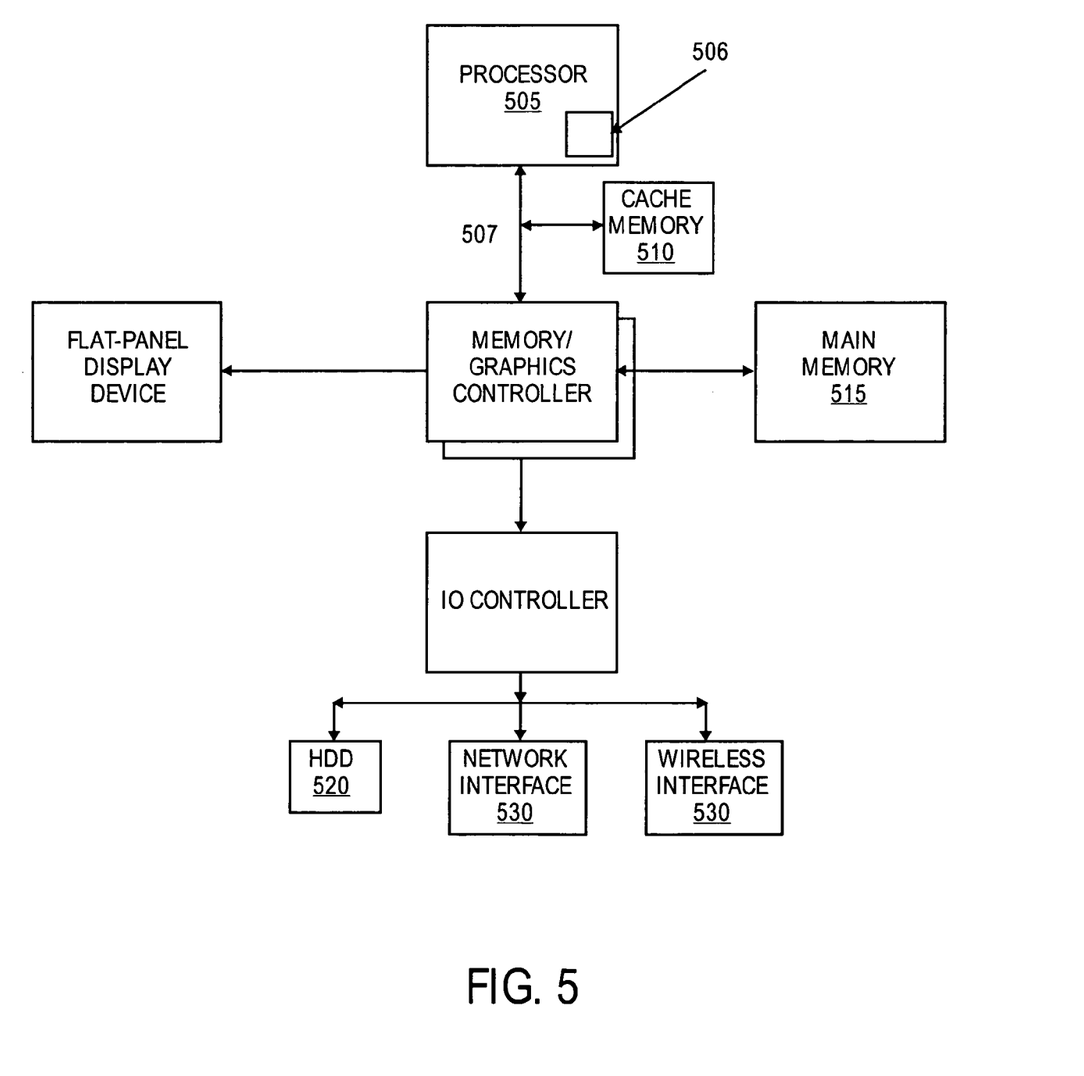
FIG. 5 is a shared bus system in which one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache.

Illustrated within the processor of FIG. 5 is a storage area 506 for machine state. In one embodiment storage area may be a set of registers, whereas in other embodiments the storage area may be other memory structures. Also illustrated in FIG. 5 is a storage area 507 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507.

Figure 6:
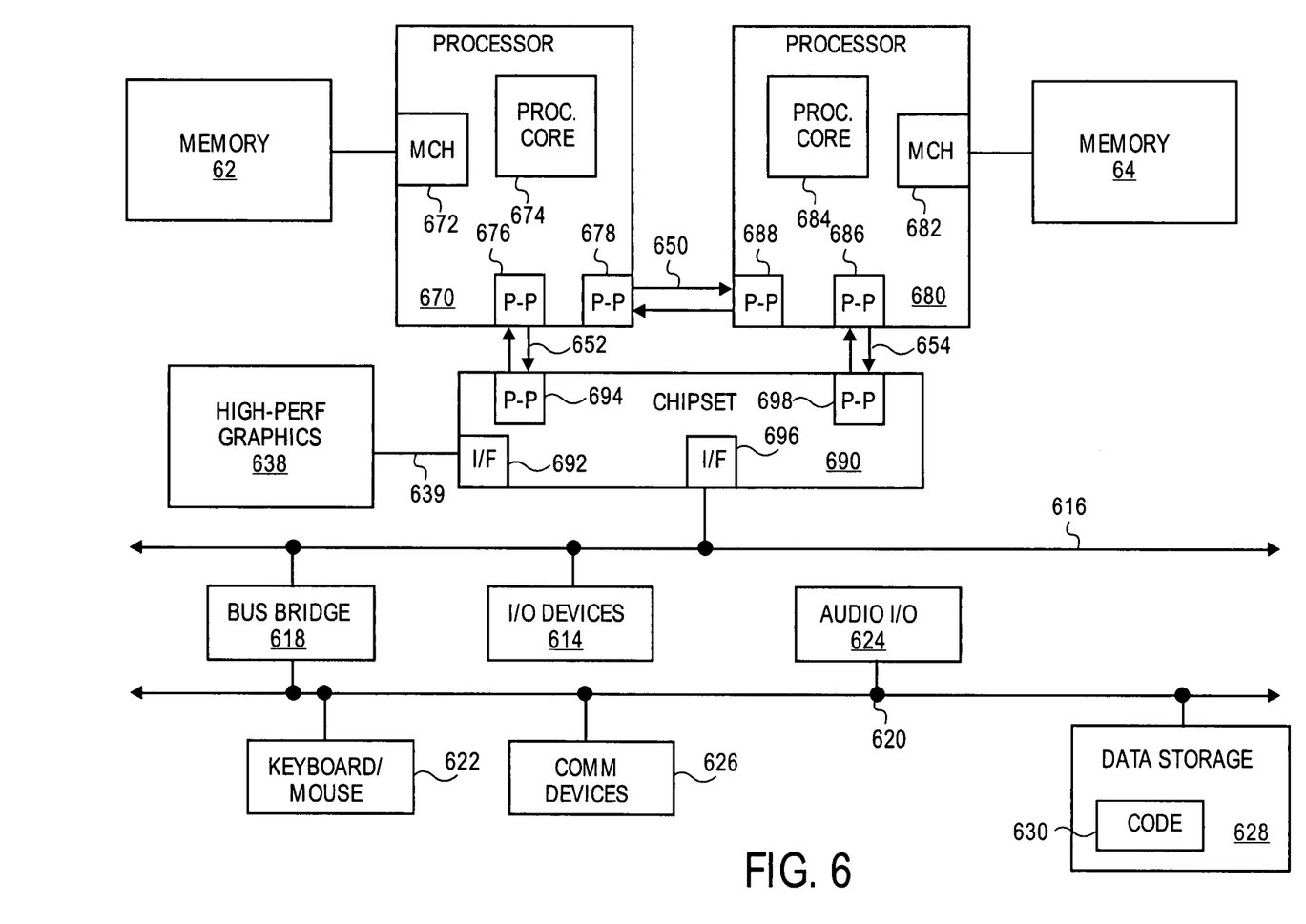
FIG. 6 is a point-to-point bus system in which one embodiment of the invention may be used.

Furthermore, the cache memory may contain relatively fast memory cells, such as a six-transistor (6T) cell, or other memory cell of approximately equal or faster access speed. The computer system of FIG. 5 may be a point-to-point (PtP) network of bus agents, such as microprocessors, that communicate via bus signals dedicated to each agent on the PtP network. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 22, 24. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the. data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. An apparatus comprising:
   a plurality of cache lines comprising circuitry;
   a plurality of error correcting code (ECC) storage areas coupled to the plurality of cache lines, the plurality of ECC storage areas being less than the number of cache lines, wherein the cache lines not in a modified state are to correspond to one of a number of error detection code (EDC) storage areas and not an ECC storage area.

2. The apparatus of claim 1, wherein the number of ECC storage areas is equal to a maximum number of modified cache lines.

3. The apparatus of claim 2, wherein the maximum number of modified cache lines is two.

4. The apparatus of claim 3, wherein the cache lines are within a set-associative cache that is to use a writeback coherency policy.

5. The apparatus of claim 1, wherein the plurality of cache lines include an identification (ID) field to indicate a corresponding ECC storage area to which a respective cache line corresponds.

6. The apparatus of claim 5, wherein the plurality of cache lines include a modified field (MOD) to indicate whether the corresponding cache line contains modified data.

7. The apparatus of claim 1 wherein the cache lines are located within a level-1 cache memory.

8. A system comprising:
   a memory;
   a processor, comprising circuitry, coupled to the memory to write data to a plurality of cache lines, the cache lines to store less than or equal to a maximum number of modified data, the maximum modified data being less than the plurality of cache lines, wherein the plurality of cache lines include an identification (ID) field to indicate a corresponding ECC field to which a respective cache line corresponds.

9. The system of claim 8, wherein each of the maximum number of modified data corresponds to a maximum number of error correction code (ECC) fields.

10. The system of claim 9, wherein the maximum number of modified cache data is two.

11. The system of claim 10, wherein the plurality of cache lines are within a set-associative cache that is to use a writeback coherency policy.

12. The system of claim 11, wherein the cache lines not in a modified state are to correspond to one of a number of error detection code (EDC) storage areas and not an ECC storage area.

13. The system of claim 8, wherein data within the modified data is to be written to the memory if the processor attempts to write data to the plurality of cache lines and the number of modified data is equal to the maximum number of modified data.

14. The system of claim 13, wherein the plurality of cache lines are within a level-1 (L1) cache memory.

15. The system of claim 13, wherein the plurality of cache lines are within a level-2 (L2) cache memory.

16. A method comprising:
   issuing a write operation to a cache line array;
   writing back a modified data to memory if the cache line array contains a maximum number of modified cache lines, the maximum number of modified cache lines being less than all of the cache lines in the cache line array;

writing the data to a clean cache line corresponding to the modified data; and updating an identification (ID) field in the clean cache line to point to an error correction code (ECC) field.

17. The method of claim 16, wherein a maximum number of ECC fields is equal to the number of maximum modified cache lines.

18. The method of claim 17, performing a parity check on a cache line data against an error detection code (EDC) without performing error correction if the cache line data is read.

19. The method of claim 18, wherein the maximum number of ECC fields are dynamically allocated to cache lines within the cache line array.

20. The method of claim 19, wherein the maximum number of modified cache lines is two.

21. The method of claim 20, wherein the cache line array is included within a set-associative cache.

22. The method of claim 21, wherein the set-associative cache includes 4 ways.

\* \* \* \* \*

UNITED STATES PATENT AND TRADEMARK OFFICE
CERTIFICATE OF CORRECTION

PATENT NO. : 7,606,980 B2
APPLICATION NO. : 11/363963
DATED : October 20, 2009
INVENTOR(S) : Qureshi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Twelfth Day of October, 2010

David J. Kappos
*Director of the United States Patent and Trademark Office*